US008628420B2

(12) United States Patent
Chhabra (10) Patent No.: US 8,628,420 B2
(45) Date of Patent: Jan. 14, 2014

(54) LOCATION AWARE AD-HOC GAMING

(75) Inventor: Kapil Chhabra, Sunnyvale, CA (US)

(73) Assignee: Marvell World Trade Ltd. (BB)

( * ) Notice: Subject to any disclaimer, the term of this patent is extended or adjusted under 35 U.S.C. 154(b) by 916 days.

(21) Appl. No.: 12/167,804

(22) Filed: Jul. 3, 2008

(65) Prior Publication Data

US 2009/0011834 A1 Jan. 8, 2009

Related U.S. Application Data

(60) Provisional application No. 60/947,766, filed on Jul. 3, 2007.

(51) Int. Cl.
*A63F 13/00* (2006.01)
*A63F 9/24* (2006.01)

(52) U.S. Cl.
USPC ......... 463/42; 463/1; 463/25; 463/29; 463/40

(58) Field of Classification Search
USPC ................................ 463/16, 20, 29, 40, 42, 1
See application file for complete search history.

(56) References Cited

U.S. PATENT DOCUMENTS

| | | | |
|---|---|---|---|
| 4,959,847 A | 9/1990 | Engelke et al. | |
| 5,488,693 A | 1/1996 | Houck et al. | |
| 5,738,583 A | 4/1998 | Comas et al. | |
| 5,850,592 A | 12/1998 | Ramanathan | |
| 5,877,701 A | 3/1999 | Nagakura | |
| 6,272,120 B1 | 8/2001 | Alexander | |
| 6,453,181 B1 | 9/2002 | Challa et al. | |
| 6,524,189 B1 | 2/2003 | Rautila | |
| 6,600,726 B1 | 7/2003 | Nevo et al. | |
| 6,662,229 B2 | 12/2003 | Passman et al. | |
| 6,690,935 B1 | 2/2004 | Calot et al. | |
| 6,704,866 B1 | 3/2004 | Benayoun et al. | |
| 6,707,801 B2 | 3/2004 | Hsu | |
| 6,760,587 B2 | 7/2004 | Holtzman et al. | |
| 6,785,892 B1 | 8/2004 | Miller et al. | |
| 6,788,675 B1 | 9/2004 | Yang | |
| 6,793,580 B2 | 9/2004 | Sinclair et al. | |
| 6,795,701 B1 | 9/2004 | Baker et al. | |
| 6,799,056 B2 | 9/2004 | Curley et al. | |

(Continued)

FOREIGN PATENT DOCUMENTS

CN 1375772 A 10/2002
CN 1522503 A 8/2004

(Continued)

OTHER PUBLICATIONS

"Further Higher-Speed Physical Layer Extension in the 2.4 GHz Band," IEEE, Draft Std 802.11g-2002, New York, NY, May 2002, Downloaded from the Internet, 47 pages.

(Continued)

*Primary Examiner* — Dmitry Suhol
*Assistant Examiner* — Ryan Hsu (57) ABSTRACT

A method of mobile gaming is disclosed. The method includes configuring a mobile device to communicate in a first communication protocol and a second communication protocol, determining location information for the mobile device, communicating the location information and a gaming request via the first communication protocol to a game server, receiving a gaming request response from the game server via the first communication protocol, initiating a gaming session in response to the gaming request response, wherein the gaming session is conducted via the second communication protocol.

16 Claims, 4 Drawing Sheets

(56) References Cited

U.S. PATENT DOCUMENTS

| | | |
|---|---|---|
| 6,859,460 B1 | 2/2005 | Chen |
| 6,879,570 B1 | 4/2005 | Choi |
| 6,879,574 B2 | 4/2005 | Naghian et al. |
| 6,879,812 B2 | 4/2005 | Agrawal et al. |
| 6,909,705 B1 | 6/2005 | Lee et al. |
| 6,932,698 B2 | 8/2005 | Sprogis |
| 6,975,613 B1 | 12/2005 | Johansson |
| 6,980,522 B2 | 12/2005 | Boyle |
| 7,013,391 B2 | 3/2006 | Herle et al. |
| 7,072,323 B2 | 7/2006 | Roberts et al. |
| 7,073,129 B1 | 7/2006 | Robarts et al. |
| 7,095,732 B1 | 8/2006 | Watson, Jr. |
| 7,097,562 B2 | 8/2006 | Gagner |
| 7,110,366 B2 | 9/2006 | Hulyalkar et al. |
| 7,120,129 B2 | 10/2006 | Ayyagari et al. |
| 7,120,456 B1 | 10/2006 | Elliot et al. |
| 7,158,798 B2 * | 1/2007 | Lee et al. ............... 455/456.3 |
| 7,181,544 B2 | 2/2007 | Vangal et al. |
| 7,190,961 B2 | 3/2007 | Burr |
| 7,224,964 B2 | 5/2007 | Souissi et al. |
| 7,236,772 B1 | 6/2007 | Botzas |
| 7,251,235 B2 | 7/2007 | Wentink |
| 7,257,721 B2 | 8/2007 | Chung et al. |
| 7,324,444 B1 | 1/2008 | Liang et al. |
| 7,347,781 B2 * | 3/2008 | Schultz ......................... 463/42 |
| 7,400,722 B2 | 7/2008 | Qi et al. |
| 7,435,179 B1 | 10/2008 | Ford |
| 7,440,430 B1 | 10/2008 | Jagadeesan et al. |
| 7,452,278 B2 | 11/2008 | Chen et al. |
| 7,457,271 B2 | 11/2008 | Donovan |
| 7,496,065 B2 | 2/2009 | Anjum et al. |
| 7,505,795 B1 | 3/2009 | Lim et al. |
| 7,515,897 B2 | 4/2009 | Suzuki |
| 7,616,588 B2 | 11/2009 | Gatta et al. |
| 7,729,661 B2 * | 6/2010 | Tanaka et al. ................. 455/41.2 |
| 7,733,861 B2 * | 6/2010 | Suga ............................ 370/392 |
| 7,899,017 B2 * | 3/2011 | Yu et al. ...................... 370/338 |
| 7,978,647 B2 | 7/2011 | Anjum et al. |
| 7,990,903 B2 | 8/2011 | Nishihara et al. |
| 8,073,923 B2 * | 12/2011 | Sasaki et al. ................. 709/209 |
| 8,180,363 B2 | 5/2012 | Maekawa et al. |
| 8,321,587 B2 | 11/2012 | Burr |
| 2001/0055950 A1 | 12/2001 | Davies et al. |
| 2002/0013784 A1 | 1/2002 | Swanson |
| 2002/0061743 A1 | 5/2002 | Hutcheson et al. |
| 2002/0091790 A1 | 7/2002 | Cubley |
| 2002/0103019 A1 | 8/2002 | Emmerson |
| 2002/0107985 A1 | 8/2002 | Hwang et al. |
| 2002/0147044 A1 | 10/2002 | Jackobsson et al. |
| 2002/0151366 A1 | 10/2002 | Walker et al. |
| 2002/0159401 A1 | 10/2002 | Boger |
| 2002/0176366 A1 | 11/2002 | Ayyagari et al. |
| 2002/0191560 A1 | 12/2002 | Chen et al. |
| 2002/0191573 A1 * | 12/2002 | Whitehill et al. ............. 370/338 |
| 2002/0199124 A1 | 12/2002 | Adkisson |
| 2003/0023761 A1 | 1/2003 | Jeansonne et al. |
| 2003/0041150 A1 | 2/2003 | Passman et al. |
| 2003/0069018 A1 | 4/2003 | Matta et al. |
| 2003/0078062 A1 | 4/2003 | Burr |
| 2003/0084337 A1 | 5/2003 | Simionescu et al. |
| 2003/0099212 A1 | 5/2003 | Anjum et al. |
| 2003/0163579 A1 | 8/2003 | Knauerhase et al. |
| 2003/0182454 A1 | 9/2003 | Huth et al. |
| 2003/0224855 A1 | 12/2003 | Cunningham |
| 2003/0231189 A1 | 12/2003 | Williams |
| 2003/0231625 A1 | 12/2003 | Calvignac et al. |
| 2004/0066751 A1 | 4/2004 | Tseng et al. |
| 2004/0081110 A1 | 4/2004 | Koskimies |
| 2004/0082383 A1 | 4/2004 | Muncaster et al. |
| 2004/0105415 A1 | 6/2004 | Fujiwara et al. |
| 2004/0110563 A1 | 6/2004 | Tanaka et al. |
| 2004/0127277 A1 | 7/2004 | Walker et al. |
| 2004/0127289 A1 | 7/2004 | Davis et al. |
| 2004/0139159 A1 | 7/2004 | Ricciardi et al. |
| 2004/0146022 A1 | 7/2004 | Lewis et al. |
| 2004/0174829 A1 | 9/2004 | Ayyagari |
| 2004/0185851 A1 | 9/2004 | Nagai |
| 2004/0196808 A1 | 10/2004 | Chaskar et al. |
| 2004/0259542 A1 | 12/2004 | Vitamaki et al. |
| 2005/0032577 A1 | 2/2005 | Blackburn et al. |
| 2005/0041660 A1 | 2/2005 | Pennec et al. |
| 2005/0073980 A1 | 4/2005 | Thomson et al. |
| 2005/0088980 A1 | 4/2005 | Olkkonen et al. |
| 2005/0099977 A1 | 5/2005 | Williams et al. |
| 2005/0122940 A1 | 6/2005 | Nian |
| 2005/0129055 A1 | 6/2005 | Hall et al. |
| 2005/0138462 A1 | 6/2005 | Hunt et al. |
| 2005/0157661 A1 | 7/2005 | Cho |
| 2005/0177639 A1 | 8/2005 | Reunamäki et al. |
| 2005/0181872 A1 | 8/2005 | Acharya et al. |
| 2005/0197189 A1 | 9/2005 | Schultz |
| 2005/0221897 A1 | 10/2005 | Oe |
| 2005/0250487 A1 | 11/2005 | Miwa et al. |
| 2005/0250497 A1 | 11/2005 | Ghosh et al. |
| 2005/0268003 A1 | 12/2005 | Wang et al. |
| 2005/0268151 A1 | 12/2005 | Hunt et al. |
| 2005/0286456 A1 | 12/2005 | McNew et al. |
| 2005/0286464 A1 | 12/2005 | Saadawi et al. |
| 2005/0286480 A1 | 12/2005 | Akiyama |
| 2006/0013160 A1 | 1/2006 | Haartsen |
| 2006/0041750 A1 | 2/2006 | Carter et al. |
| 2006/0045138 A1 | 3/2006 | Black et al. |
| 2006/0046709 A1 | 3/2006 | Krumm et al. |
| 2006/0056378 A1 | 3/2006 | Sugaya |
| 2006/0062220 A1 | 3/2006 | Suga |
| 2006/0095290 A1 | 5/2006 | Chernev |
| 2006/0106963 A1 | 5/2006 | Sasaki et al. |
| 2006/0135261 A1 | 6/2006 | Kinne et al. |
| 2006/0135262 A1 | 6/2006 | Kennedy et al. |
| 2006/0154710 A1 | 7/2006 | Serafat |
| 2006/0166740 A1 | 7/2006 | Sufuentes |
| 2006/0179322 A1 | 8/2006 | Bennett et al. |
| 2006/0205409 A1 | 9/2006 | Chiou et al. |
| 2006/0221858 A1 | 10/2006 | Switzer et al. |
| 2006/0221915 A1 | 10/2006 | Gatta et al. |
| 2006/0246947 A1 | 11/2006 | Fujii et al. |
| 2006/0251004 A1 | 11/2006 | Zhong et al. |
| 2006/0259632 A1 * | 11/2006 | Crawford et al. ............. 709/229 |
| 2006/0282541 A1 | 12/2006 | Hiroki |
| 2007/0030116 A1 * | 2/2007 | Feher .......................... 340/5.53 |
| 2007/0030824 A1 | 2/2007 | Ribaudo et al. |
| 2007/0047547 A1 | 3/2007 | Conner et al. |
| 2007/0060355 A1 | 3/2007 | Amaitis et al. |
| 2007/0060358 A1 | 3/2007 | Amaitis et al. |
| 2007/0086394 A1 | 4/2007 | Yamada et al. |
| 2007/0086424 A1 | 4/2007 | Calcev et al. |
| 2007/0099703 A1 | 5/2007 | Terebilo |
| 2007/0105548 A1 | 5/2007 | Mohan et al. |
| 2007/0141988 A1 | 6/2007 | Kuehnel et al. |
| 2007/0155505 A1 | 7/2007 | Huomo |
| 2007/0190494 A1 * | 8/2007 | Rosenberg ..................... 434/11 |
| 2007/0202890 A1 * | 8/2007 | Feher .......................... 455/456.1 |
| 2007/0202910 A1 | 8/2007 | Brewer et al. |
| 2007/0265018 A1 * | 11/2007 | Feher .......................... 455/456.1 |
| 2007/0291761 A1 * | 12/2007 | Kauniskangas et al. ... 370/395.2 |
| 2008/0013487 A1 | 1/2008 | Molteni et al. |
| 2008/0019522 A1 * | 1/2008 | Proctor ......................... 380/255 |
| 2008/0037444 A1 | 2/2008 | Chhabra |
| 2008/0037495 A1 | 2/2008 | Anjum et al. |
| 2008/0039015 A1 | 2/2008 | Nakata et al. |
| 2008/0043868 A1 * | 2/2008 | Feher ........................... 375/260 |
| 2008/0069105 A1 | 3/2008 | Costa et al. |
| 2008/0095112 A1 | 4/2008 | Wiemann et al. |
| 2008/0096662 A1 | 4/2008 | Kuwahara et al. |
| 2008/0108437 A1 * | 5/2008 | Kaarela et al. ................. 463/42 |
| 2008/0146337 A1 | 6/2008 | Halonen et al. |
| 2008/0146343 A1 * | 6/2008 | Sullivan et al. ................. 463/42 |
| 2008/0164984 A1 | 7/2008 | Sheffer |
| 2008/0167865 A1 | 7/2008 | Yamanashi et al. |
| 2008/0172491 A1 | 7/2008 | Chhabra et al. |
| 2008/0220878 A1 | 9/2008 | Michaelis |
| 2009/0011834 A1 | 1/2009 | Chhabra |
| 2009/0048024 A1 | 2/2009 | Tanaka et al. |
| 2009/0180441 A1 | 7/2009 | Ikeda |

(56) References Cited

U.S. PATENT DOCUMENTS

| | | | |
|---|---|---|---|
| 2009/0191878 | A1 | 7/2009 | Hedqvist et al. |
| 2009/0210531 | A1 | 8/2009 | Melnikov |
| 2009/0279506 | A1 | 11/2009 | Sinnreich et al. |
| 2010/0087240 | A1 | 4/2010 | Egozy et al. |
| 2010/0278077 | A1 | 11/2010 | Reunamaki et al. |
| 2012/0072485 | A1 | 3/2012 | Hutcheson et al. |
| 2012/0329554 | A1 | 12/2012 | Mgrdechian et al. |

FOREIGN PATENT DOCUMENTS

| | | |
|---|---|---|
| CN | 1842000 A | 10/2006 |
| EP | 1622319 | 5/2004 |
| JP | 2004-136009 | 10/2002 |
| JP | 2004-141225 | 10/2002 |
| JP | 2003-283277 | 10/2003 |
| JP | 2003-289277 A | 10/2003 |
| JP | 2004-135778 | 5/2004 |
| JP | 2006-086959 | 9/2004 |
| JP | 2006-50020 | 2/2006 |
| JP | 2006-148448 | 6/2006 |
| JP | 2006-148488 | 6/2006 |
| WO | WO 03/003610 A1 | 6/2002 |
| WO | WO 2004/062198 | 7/2004 |
| WO | WO 2005/076543 | 8/2005 |

OTHER PUBLICATIONS

"Part 11: Wireless LAN Medium Access Control (MAC) and Physical Layer (PHY) specifications: Higher-Speed Physical Layer Extension in the 2.4 GHz Band," IEEE Std 802.11b-1999, New York, NY, Jan. 20, 2000, Downloaded from the Internet, 96 pages.

"Part 11: Wireless LAN Medium Access Control (MAC) and Physical Layer (PHY) specifications: High-Speed Physical Layer in the 5 GHz Band," IEEE Std 802.11a-1999, New York, NY, Dec. 30, 1999, Downloaded from the Internet, 91 pages.

"TGn Sync Proposal Technical Specification," Mujtaba, Syed Aon, IEEE 802.11-04/0889r6, Allentown, PA, May 2005, Downloaded from the Internet, 131 pages.

U.S. Appl. No. 11/867,665, "Power Save Mechanisms for Dynamic Ad-Hoc Networks," Kopikare, et al., filed Oct. 4, 2007.

Lortz et al., "*Wi-Fi Simple Config Specification*," Wi-Fi Alliance Confidential, Version 1.0a, Feb. 10, 2006.

International Search Report for PCT Application No. PCT/US2007/080733 mailed Sep. 9, 2008.

Written Opinion for PCT Application No. PCT/US200708733 mailed Sep. 9, 2008.

International Search Report for PCT Application No. PCT/US07/17529 mailed Oct. 1, 2008.

Written Opinion of the International Searching Authority for PCT Application No. PCT/US07/17529 mailed Oct. 1, 2008.

Notification Concerning Transmittal of International Preliminary Report on Patentability for PCT Application No. PCT/US2007/080733 mailed Apr. 30, 2009.

Chinese Office Action issued in Chinese Application No. 200780038678.7 mailed Sep. 13, 2010.

Chinese Office Action for Application No. 200780037626.8 dated Jul. 8, 2011.

Office Action issued in U.S. Appl. No. 11/800,166 mailed Jun. 25, 2009.

Office Action issued in U.S. Appl. No. 11,800,166 mailed Feb. 24, 2010.

Office Action issued in U.S. Appl. No. 11/800,166 mailed Aug. 19, 2010.

Office Action issued in U.S. Appl. No. 11/800,166 mailed Mar. 29, 2011.

Office Action issued in U.S. Appl. No. 11/867,665 mailed Nov. 23, 2010.

Notice of Allowance issued in U.S. Appl. No. 11/867,665 mailed Feb. 28, 2011.

Office Action issued in U.S. Appl. No. 11/867,661 mailed Sep. 15, 2009.

Office Action issued in U.S. Appl. No. 11/867,661 mailed Mar. 26, 2010.

Office Action issued in U.S. Appl. No. 11/867,661 mailed Nov. 1, 2010.

Office Action issued in U.S. Appl. No. 11/924,431 mailed Apr. 12, 2011.

Office Action issued in U.S. Appl. No. 11/924,431 mailed Oct. 17, 2011.

Office Action issued in U.S. Appl. No. 11/800,166 mailed Nov. 3, 2011.

Hirano Aya, "Introductory Techniques for current Wireless LAN," Nikkei network vol. 67, Japan Nikkei BP, Nikkei Business Publications, Inc., 2005, (see also English translation of Summary of Japanese office Action dated Nov. 29, 2011).

Japanese Office Action dated Nov. 29, 2011 for Japanese Patent Application No. 2009-523819, including English translation of Summary of Japanese Office Action.

Office Action for U.S. Appl. No. 11/867,661 dated Sep. 5, 2012.

Office Action for U.S. Appl. No. 11/924,431 dated Nov. 26, 2012.

Office Action for U.S. Appl. No. 11/800,166 dated Apr. 20, 2012.

Office Action for Japanese Patent Application No. 2009-532521 dated Sep. 18, 2012.

Office Action for Chinese Patent Application No. 2007800386787 dated Apr. 28, 2012.

Office Action for Japanese Patent Application No. 2009-532521 dated Jan. 15, 2013 (5 pgs).

Office Action for U.S. Appl. No. 11/867,661 dated Mar. 11, 2013 (16 pgs).

The Institute of Electrical and Electronics Engineers, Inc., "Part 11: Wireless LAN Medium Access Control (MAC) and Physical Layer (PHY) specifications, Amendment 2: Higher-speed Physical Layer (PHY) extension in the 2.4 GHz band," IEEE Std 802.11b-1999/Cor 1-2001, New York, NY, Nov. 7, 2001, 23 pages.

The Institute of Electrical and Electronics Engineers, Inc., "Part 11: Wireless LAN Medium Access Control (MAC) and Physical Layer (PHY) specifications: Further Higher Data Rate Extension in the 2.4 GHz Band," IEEE P802.11g/D8.2, New York, NY, Apr. 2003, 69 pages.

The Institute of Electrical and Electronics Engineers, Inc., "Part 11: Wireless LAN Medium Access Control (MAC) and Physical Layer (PHY) specifications, Amendment 5: Spectrum and Transmit Power Management Extensions in the 5 GHz band in Europe," IEEE Std 802.11h-2003, New York, NY, Oct. 14, 2003, 75 pages.

The Institute of Electrical and Electronics Engineers, Inc., "Part 11: Wireless LAN Medium Access Control (MAC) and Physical Layer (PHY) specifications, Amendment 6: Medium Access Control (MAC) Security Enhancements," IEEE Std 802.11i-2004, New York, NY, Jul. 23, 2004, 190 pages.

The Institute of Electrical and Electronics Engineers, Inc., "Part 11: Wireless LAN Medium Access Control (MAC) and Physical Layer (PHY) specifications, Amendment 7: Medium Access Control (MAC) Quality of Service (QoS) Enhancements," IEEE P802.11e/D11.0, New York, NY, Oct. 2004, 195 pages.

U.S. Appl. No. 11/800,166, "Ad-Hoc Simple Configuration," Kapil Chhabra, filed May 4, 2007, 34 pages.

U.S. Appl. No. 11/867,661, "Automatic Ad-Hoc Network Creation and Coalescing Using WPS," Chhabra et al., filed Oct. 4, 2007, 24 pages.

U.S. Appl. No. 11/924,431, "System and Method for Gaming in an Ad-Hoc Network," Kopikare et al., filed Oct. 25, 2007, 32 pages.

International Search Report for corresponding PCT Application No. PCT/US2008/069185, mailed Sep. 3, 2008, 1 page.

Written Opinion for corresponding PCT Application No. PCT/US2008/069185, mailed.Sep. 3, 2008, 1 page.

Office Action issued in U.S. Appl. No. 11/542,393, mailed Nov. 9, 2009, 28 pages.

Office Action issued in U.S. Appl. No. 11/542,393, mailed Apr. 9, 2010, 30 pages.

(56) References Cited

OTHER PUBLICATIONS

Office Action issued in U.S. Appl. No. 11/867,661, mailed Jun. 11, 2010, 28 pages.
First Office Action issued in Chinese Application No. 200780037626.8, English Language Translation, dated Jul. 8, 2010, 11 pages.
Office Action issued in U.S. Appl. No. 11/542,393, mailed Aug. 5, 2010, 45 pages.
Office Action issued in U.S. Appl. No. 11/542,393, mailed Apr. 13, 2011, 98 pages.
Notice of Allowance issued in U.S. Appl. No. 11/867,665, mailed Sep. 2, 2011, 11 pages.
Second Office Action issued in Chinese Application No. 200780038678.7, dated Oct. 18, 2011, 16 pages, including English language translation.
Office Action issued in Japanese Application No. 2009-532521, dated Feb. 7, 2012, 4 pages, including English language translation.
Notice of Allowance issued in U.S. Appl. No. 11/867,665, mailed Feb. 10, 2012, 11 pages.
Notice of Allowance issued in U.S. Appl. No. 11/542,393, mailed May 14, 2012, 45 pages.
Notice of Allowance issued in U.S. Appl. No. 11/800,166, mailed Aug. 14, 2012, 19 pages.
Notice of Allowance issued in U.S. Appl. No. 11/800,166, mailed Feb. 22, 2013, 6 pages.
Notice of Allowance issued in U.S. Appl. No. 11/800,166, mailed May 21, 2013, 7 pages.
Lety, Emmanuel et al., "MiMaze, a 3D Multi-Player Game on the Internet," *Proc. of the 4$^{th}$ International Conference of VSMM (Virtual Systems and MultiMedia)*, Gifu, Japan, 1998, 6 pages.

* cited by examiner

LOCATION AWARE AD-HOC GAMING

CROSS REFERENCE TO RELATED APPLICATIONS

This patent claims the priority benefit under 35 U.S.C. §119(e) of U.S. provisional patent application Ser. No. 60/947,766, filed on Jul. 3, 2007, titled "LOCATION AWARE AD-HOC GAMING", the content of which is incorporated in its entirety herein by reference for all purposes.

This patent is related to copending U.S. patent application Ser. No. 11/867,665 (MP1382), filed on Oct. 4, 2007, titled "POWER SAVE MECHANISMS FOR DYNAMIC AD-HOC NETWORKS," and U.S. patent application Ser. No. 11/867,661 (MP1381), filed on Oct. 4, 2007, titled "AUTOMATIC AD-HOC NETWORK CREATION AND COALESCING USING WPS," the contents of which are incorporated herein by reference for all purposes.

BACKGROUND

Wireless fidelity (Wi-Fi) networks are utilized to exchange information in both personal and corporate environments. One known Wi-Fi standard, the Wireless Local Area Network (WLAN) standard, specifies and details the set up, communications and the configuration protocols for an infrastructure WLAN.

Figure 1:
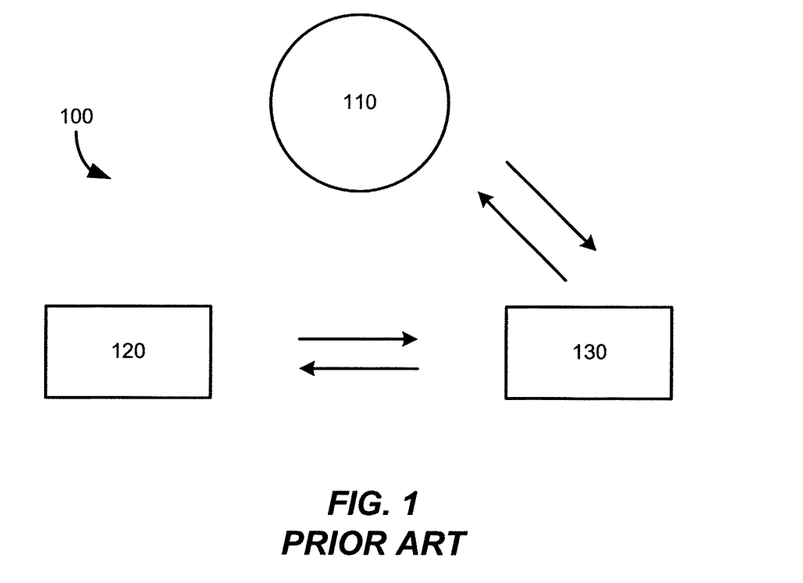
FIG. 1 illustrates an embodiment of a known infrastructure network.

FIG. 1 illustrates an exemplary configuration of a known network such as infrastructure WLAN 100. The infrastructure WLAN 100 includes three logical components or elements: an access point 110; a registrar 120, and a client 130. In operation, the client 130 will query or communicate with the registrar 120 via, for example, an IEEE 802.11x (802.11a, 802.11b, 802.11g . . . 802.11n, 802.11x) network, in an attempt to acquire network or communications credentials. Upon receipt of the network credentials, the client 130 establishes a communications link to access point 110. In alternate embodiments, the registrar 120 may be a portion or subsystem of the access point 110 and/or may be in communication with the access point 110.

Ad-hoc networks may be established in place of the infrastructure WLAN 100. Ad-hoc networks allow a client to establish an arbitrary and/or temporary network with one or more additional clients within a given communications area or range. Thus, ad-hoc networks provide configuration and operational flexibility to allow clients and/or devices that enter into communication range with each other to be configured to share information. It would be desirable to establish the communications link between the clients and/or devices in a seamless manner. Moreover, it would be desirable to allow for real-time or near real-time communications in order to quickly share and/or distribute time-sensitive information. It would further be desirable to implement interactive games or strategy simulations between one or more users and/or wireless devices within communications range of each other.

SUMMARY

The present disclosure generally relates to wireless communications between mobile devices, and more particularly to games and gaming between wireless devices in an ad-hoc network.

In one embodiment, a method of mobile gaming is disclosed. The method includes configuring a mobile device to communicate in a first communication protocol and a second communication protocol, determining location information for the mobile device, communicating the location information and a gaming request via the first communication protocol to a game server, receiving a gaming request response from the game server via the first communication protocol, initiating a gaming session in response to the gaming request response, wherein the gaming session is conducted via the second communication protocol.

A mobile gaming device is disclosed. The mobile gaming device includes a communication system configured to communicate via a first communication protocol and a second communication protocol. The mobile gaming device further includes a controller configured to, determine location information associated with the mobile gaming device, communicate the location information and a gaming request via the first communication protocol to a game server, receive a gaming request response from the game server via the first communication protocol, and initiate a gaming session in response to the gaming request response, wherein the gaming session is conducted via the second communication protocol.

Additional features and advantages of the present invention are described in, and will be apparent from, the following Detailed Description and the figures.

DETAILED DESCRIPTION

Figure 2:
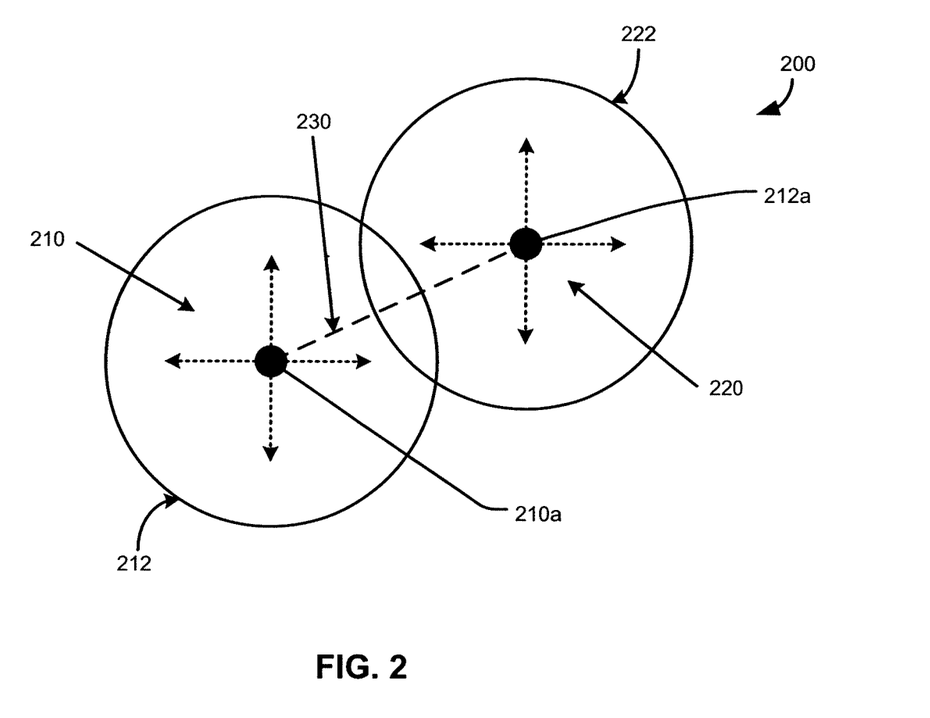
FIG. 2 illustrates an embodiment of an ad-hoc network that may be implemented in conjunction with the disclosure provided herein.

FIG. 2 illustrates an embodiment of a wireless network that may be established without the logical components illustrated in FIG. 1. The wireless network of FIG. 2 is referred to as an ad-hoc network 200. The ad-hoc network 200 does not include an access point 110 and may be established directly between wireless devices 210 and 220. For example, the wireless devices 210 and 220 are free roaming and randomly mobile devices each having a communications range 212, 222, respectively. When the wireless devices 210, 220 are in range of each other, as shown in FIG. 2, a communications link 230 may be established directly between each device. In particular, the communications link 230 may be established between a wireless component 210a of the wireless device 210 and a wireless component 212a of the wireless device 212. The wireless components 210a, 212a may be configured to communicate via any known wireless standard such as, for example, 802.11x, SMS, ZigBee. The communications link 230 forms the basis for the ad-hoc network 200 and allows for the exchange of information without the need for an access point 110 or additional hardware. Alternate configurations and arrangements of ad-hoc networks are discussed and disclosed in U.S. patent application Ser. No. 11/867,661 (MP1381), filed on Oct. 4, 2007, titled "AUTOMATIC AD-HOC NETWORK CREATION AND COALESCING USING WPS," the contents of which is incorporated herein by reference for all purposes.

Exemplary techniques for establishing the ad-hoc network 200 are discussed and disclosed herein. For example, the wireless device 210 may be configured to transition between an awake (active) mode and a sleep (inactive) mode during periods defined as beacon intervals. The beacon interval may be defined as a basic unit of time during which the wireless devices 210, 220 are operational. Beacon intervals may be further divided into: (1) an awake subinterval during which the wireless device is either transmitting a network connection request or listening for network activity; and (2) a sleep subinterval during which the network device is conserving power by not transmitting or receiving network messages. Before the communication link 230 or network connection is established and while awake or active, the wireless device 210 transmits or broadcasts a beacon, probe or network connection request and also listens for network activity and/or a network connection response or response beacon from, for example, the wireless device 220 if it is within the communication range 212. If a response beacon or response message is not detected while the wireless device 210 is listening, the wireless device 210 enters the sleep (inactive) mode to conserve power.

In an alternate embodiment, the wireless device 210 may alter the length and occurrence of the awake (active) mode relative to the start of each beacon interval. In another alternate embodiment, the beacon or network connection request and/or the network connection response or response beacon can be configured to include network or device information, data, etc., specific to the transmitting or broadcasting device, for example, the wireless device 210 in the example discussed above. In some embodiments, the information may include an OSI (open systems interconnection) Layer 2 address of the wireless device 210 such as a media access control (MAC) address. Different or additional information elements such as PIN codes and security credentials may also be included as part of the network connection request or probe.

Figure 3:
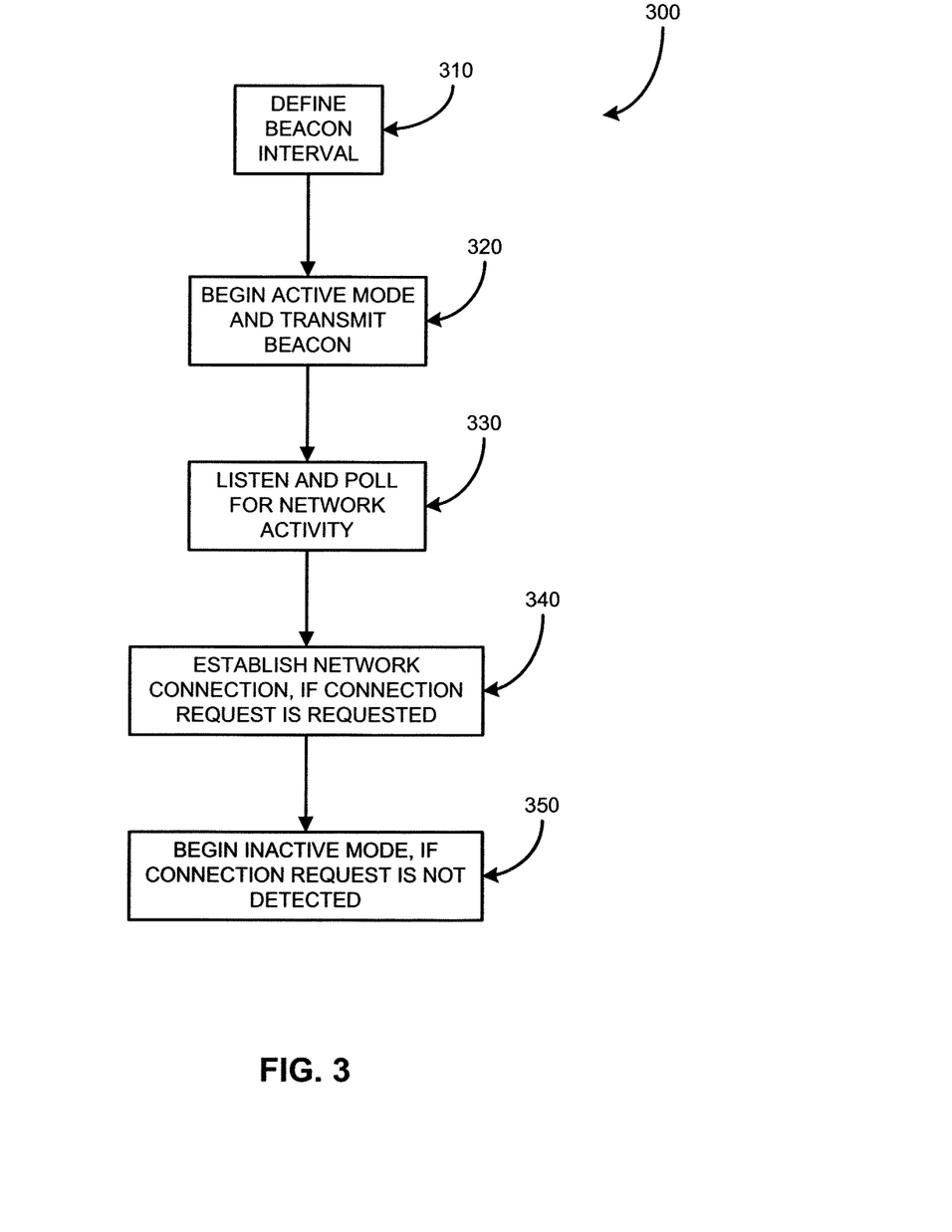
FIG. 3 illustrates a flowchart representative of one embodiment of an ad-hoc network connection methodology in accordance with the teaching disclosed herein.

FIG. 3 illustrates an embodiment of a communication sequence 300 which may be implemented by the wireless devices 210, 220. The embodiment of the communication sequence 300 discussed herein refers to the wireless device 210, however it will be understood that additional wireless devices 220, etc. may utilize the disclosure and teaching provided herein when establishing the ad-hoc network 200.

At block 310, a beacon interval may be defined for the wireless device 210. The beacon interval represents a basic unit of time measurement within the communication sequence 300. As previously discussed, the beacon interval may be divided into an awake or active interval and a sleep or inactive interval. The awake or active interval may be further described as the "sniff subinterval" or "sniff interval." The sniff subinterval or sniff interval represents the portion or period within the beacon interval during which the wireless device 210 is transmitting a beacon, probe or network connection request, or listening for network activity. In one embodiment, the beacon interval may be equally subdivided into a plurality of subintervals. Thus, the sniff subinterval or sniff interval may occur regularly within the beacon interval and may span one or more of the equal subintervals. An exemplary beacon interval may have a duration of approximately one hundred milliseconds (100 ms) or may be configured to conform to any network requirements and/or application-specific criteria.

At block 320, the wireless device 210 transitions to the awake or active mode during the predefined or established sniff subinterval. During the sniff subinterval the wireless device transmits a beacon, probe or other message to any device within the communication range 212. As previously discussed, the beacon operates or acts as a network connection request and may be generated by the wireless device 210 operating as a network registrar 120 or equivalent. Alternatively, the beacon may be a probe request generated by, for example, the client or wireless device 210 searching for the registrar 120 which may be, in this example, the wireless device 220.

At block 330, the wireless device 210, operating within the sniff subinterval, listens or polls the communication range 212 in an attempt to identify network activity. It will be understood that the steps, process and/or functionality discussed in conjunction with blocks 320 and 330 may be performed serially as disclosed herein. Alternatively, the steps, processes and/or functionality discussed in conjunction with blocks 320 and 330 may be performed in parallel or reordered such that block 330 (listening) is performed before block 320 (transmitting or broadcasting). In one exemplary embodiment, the duration or period of the sniff subinterval may be approximately three point two milliseconds (3.2 ms).

At block 340, the wireless device 210 may establish a communications link 230 or network connection with a device, for example, the wireless device 220, within the communication range 212. For example, the wireless device 210, while listening for network activity or beacons, may detect a network connection request transmitted by another device, for example the wireless device 220. The network connection request may represent a beacon generated by the wireless device 220 or it may represent a response to the beacon transmitted by the wireless device 210. In one embodiment, the wireless device 220 may detect the beacon transmitted at block 320 during one of the preceding beacon intervals and may have transmitted a response. The response, in turn, may be detected by the wireless device 210 during the current or active sniff subinterval defined within the beacon interval. This challenge/response and/or handshake procedure provides a framework upon which the communication link 230 may be established.

Alternatively, at block 350, if a network connection request and/or a response is not detected, the wireless device 210 may enter the sleep or inactive mode. In an exemplary embodiment, the wireless device 210 may operate in the sleep or inactive mode for more than ninety percent (90%) of each beacon interval in order to, for example, conserve power. Alternative power conservation methods and scenarios are disclosed and discussed in copending U.S. patent application Ser. No. 11/867,665 (MP1382), filed on Oct. 4, 2007, titled "POWER SAVE MECHANISMS FOR DYNAMIC AD-HOC NETWORKS," the content of which is incorporated herein by reference for all purposes.

Figure 4:
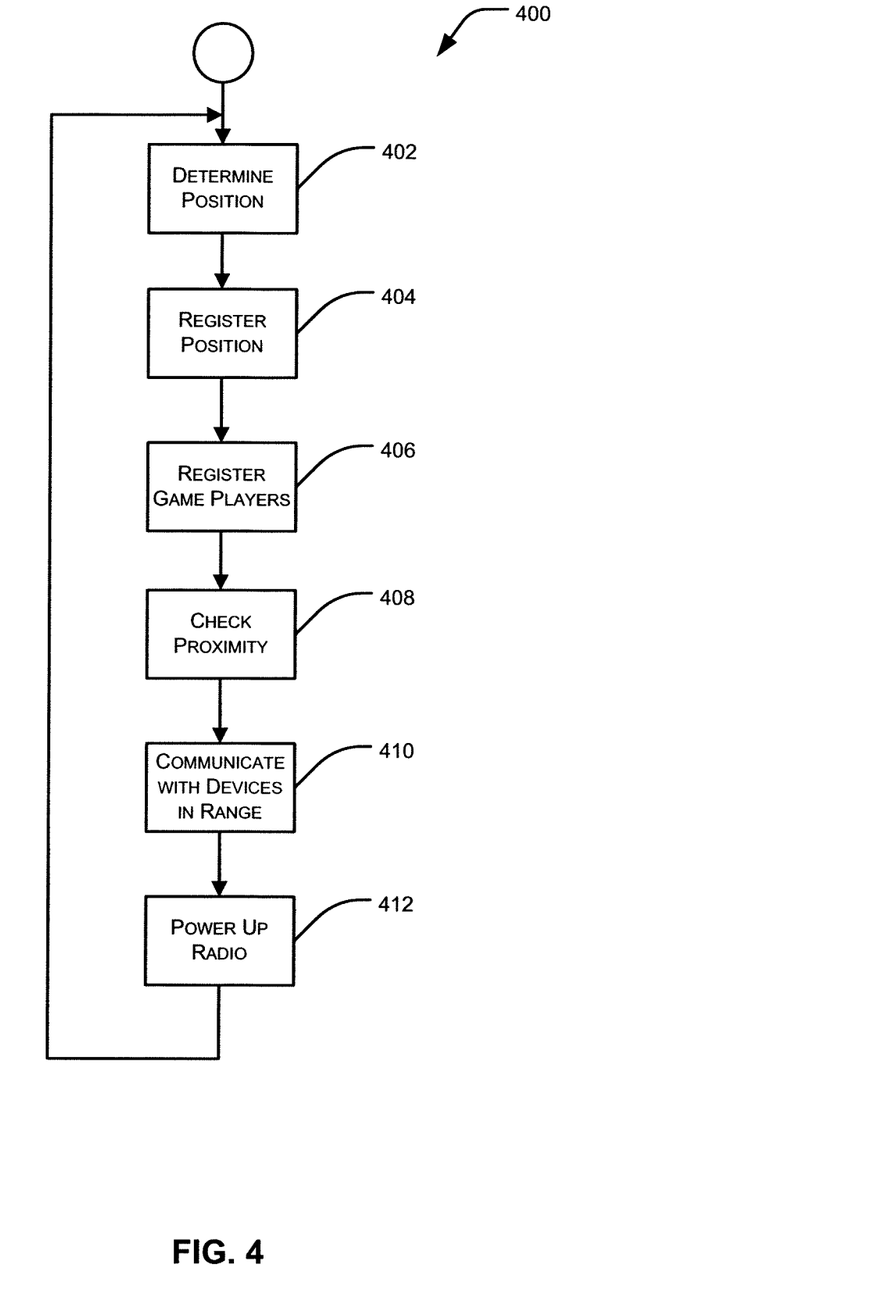
FIG. 4 illustrates another ad-hoc network connection methodology in accordance with the teaching disclosed herein.

FIG. 4 illustrates an embodiment of a communication sequence 400 which may be implemented by the wireless devices 210, 220. The communication sequence 400 may be implemented to improve the performance, battery life and connectivity between the wireless devices 210, 220. As with the communication sequence 300 discussed above, the communication sequence 400 discussed herein refers to the wireless device 210, however it will be understood that additional wireless devices 220, etc. may utilize the disclosure and teaching provided herein when establishing the ad-hoc network 200.

At block 402, the wireless device 210 may determine or calculate its current position. For example, the wireless device 210 may include a global positioning system (GPS) receiver to determine a current position based on, for example, the device latitude, longitude and altitude. Alternatively, wireless device 210 may utilize cellular triangulation to determine its position, or the user may manually enter the position or street location of the wireless device. In yet another alternative, a position may be estimated for the wireless device 210 by scanning or communicating with a WLAN or 802.11 access point configured to broadcast the position of the access point.

At block 404, the wireless device 210 may communicate a game request that is indicative of a desire, interest or ability to play an interactive game with a game server configured to host said game. The wireless device 210 may communicate with the game server utilizing the wireless communication component 210a which may include a cellular radio configured for GSM, GPRS, WCDMA and/or any other communication standard or protocol. For example, the wireless device 210 may communicate a position, desire to initiate game play, or other information with the game server via a simple message service (SMS). Position information for the wireless device 210 may be periodically updated and/or provided to the game server as needed or in a schedule manner. If the wireless device 210 includes a GPS receiver, position, direction, velocity and time information may be communicated to the game server to reduce or limit the number of communications or updates provided to the game server.

At block 406, other players or wireless devices, for example, the wireless device 220, may register and communicate with the game server.

At block 408, the game server may track and monitor the position information associated with each of the registered wireless devices 210, 220, etc. The position information for each of the registered wireless devices 210, 220, etc. may be compared to determine the proximity and/or relative location of each of the registered wireless devices to the remaining registered wireless devices.

At block 410, registered wireless devices, for example, the wireless devices 210 and 220, which are determined to be within a predefined proximity, for example, within WiFi or WLAN range (approximately 100 m) of each other, may be alerted via a game request response such as an SMS message communicated by the game server to each wireless device 210, 220. The SMS message may include information relating to the other wireless device, the SSID of the WiFi or WLAN access point, login or configuration data, transmission rates and any other information helpful for communication via the WLAN or 802.11 access point.

At block 412, the registered wireless devices 210, 220, etc., within WiFi or WLAN range of each other may power-up or initiate a WiFi, WLAN radio, e.g., a power intensive radio, utilizing the parameters received within the SMS message discussed in connection with step or block 410. The registered wireless devices 210, 220, etc. may now communicate and/or interact to exchange information. The information exchanged may facilitate game play between the registered wireless device 210, 220, etc. If the registered wireless devices 210, 220, etc., do not, within a predefined period of time, identify or locate each other, the WiFi, WLAN radio may be powered down to conserve battery power.

The communication sequence 400 may return to the block 402 and begin the process of locating other access points and/or wireless devices for communications.

The approach outlined below attempts at facilitating ad-hoc gaming for a location aware portable device without requiring the 802.11 radio to be powered on periodically for long periods of time, consequently improving battery life.

The portable device determines its position (latitude/longitude/altitude) via GPS receiver, user input of address (via keypad) or by scanning an 802.11 Access point broadcasting position information in beacons/probe responses.

When user indicates interest in playing a game, the portable device registers its position coordinates with a server on the internet via GSM/GPRSIWCDMA. In this particular use case, SMS (Simple Message Service), will be used to register the portable device's coordinates with the server using a text message. Every time there is a pre-determined change in position of the portable device, the device would re-register its position coordinates with the server. In case GPS is available, the portable device may additionally report position, velocity and time information, to prevent frequent position updates.

Each and every player interested in playing would register with the server.

Every time a user registers its position with server, and/or periodically, the server would check its database and determine proximity of registered users to each other.

If the users are determined to be in 802.11 (about 100 m) range of each other, the server would send a SMS to the user portable device. The SMS from the server would include information about neighboring user's identity, channel to use, SSID and transmission rate to be used for communicating with the neighbor over WiFi.

The portable device would power on its short-range WiFi radio for a predetermined duration T, on receiving message in Step 5, and uses parameters (channellSSIDITx Rate) in the message to establish communication with a neighbor. If during the time T, the device discovers the intended neighbor and establishes communication, the users may end up playing a multi-player game. Otherwise, if T expires without the users discovering each other, the portable device would shut down its short range wireless radio and return processing back to step 1.

Figure 4A:
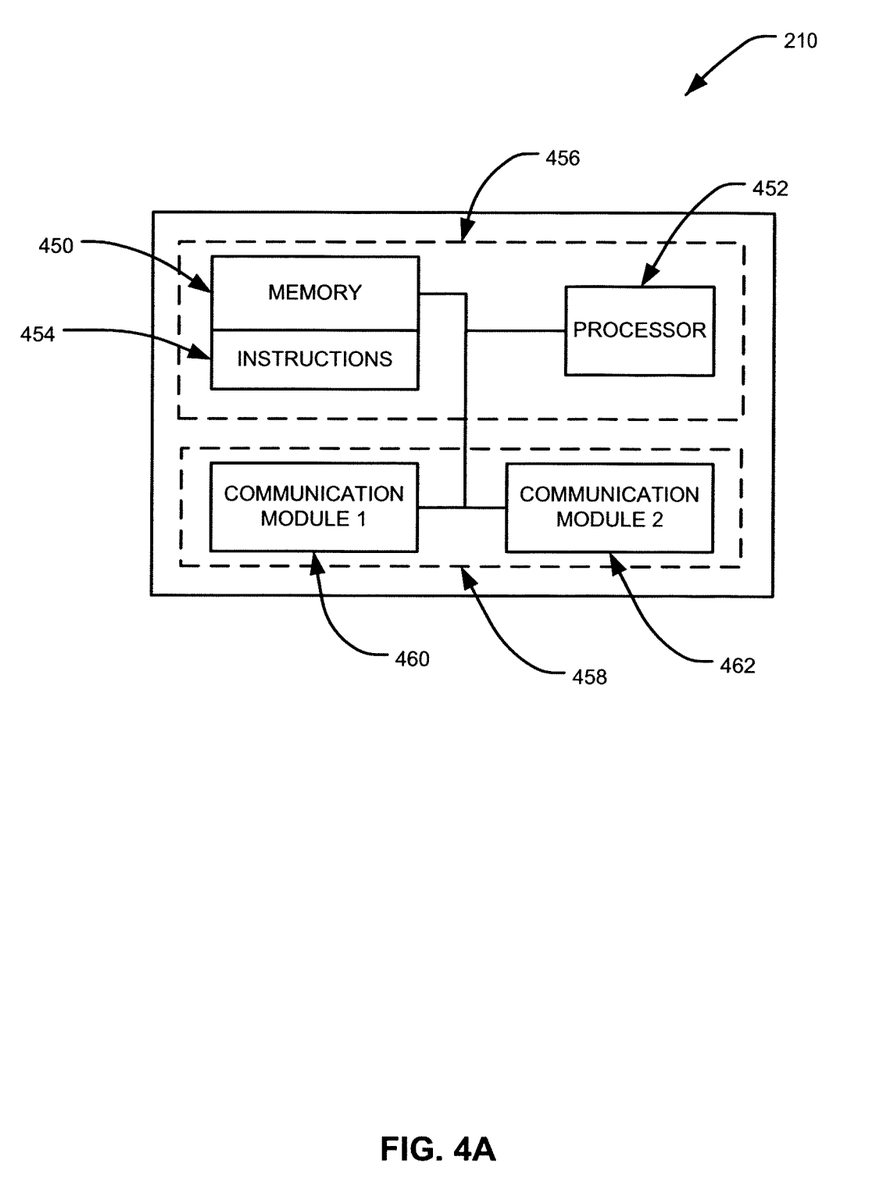
FIG. 4A illustrates one embodiment of a wireless device that may implement the ad-hoc network connection methodologies disclosed herein.

FIG. 4A illustrates an embodiment or configuration that may be implemented in one or more of the wireless devices 210, 220, etc. For example, the wireless device 210 may include a memory 450 in communication with a processor 452. The memory 450 may include or be programmed with one or more computer readable instructions 454. The computer readable instructions 454 may embody the communication sequences 300, 400, other device operation or communication functions, reporting or maintenance functions and/or other control or network level functions. The memory 450 and the processor 452 may cooperate to define a controller 456. The controller 456 may be in communication with a communication system 458. The communication system 458 may include a first communication module 460 and a second communication module 462. The first communication module 460 may be configured to communicate utilizing a first communication protocol and a WiFi or WLAN radio, while second communication module 462 may be configured to communicate utilizing a second communication protocol and a cellular radio.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method of mobile gaming for a mobile device, the mobile device configured to communicate in a cellular communication protocol and a short-range communication protocol distinct from the cellular communication protocol, the method comprising:

determining location information for the mobile device;

communicating the location information and a gaming request via the cellular communication protocol to a game server;

receiving a gaming request response from the game server via the cellular communication protocol, wherein the gaming request response indicates that another mobile device is within a communication range of the short-range communication protocol;

in response to receiving the gaming request response, powering a short-range radio configured to communicate with the another mobile device via the short-range communication protocol; and initiating a gaming session using the short-range radio, wherein the gaming session is conducted directly between the mobile device and the another mobile device via the short-range communication protocol.

2. The method of claim 1, wherein the location information is determined based on GPS information, manual information or triangulation.

3. The method of claim 1, wherein the gaming request response includes communication information; and wherein the mobile device uses the communication information in order to initiate the gaming session.

4. The method of claim 3, wherein the communication information is selected from the group consisting of: information relating to the another mobile device; an SSID of an access point, login or configuration data; and transmission rate for communicating with the another mobile device.

5. The method of claim 1 further comprising:

updating the location information for the mobile device.

6. The method of claim 1, further comprising:

monitoring whether the mobile device establishes communication with the another mobile device; and in response to failing to establish communication with the another mobile device within a predetermined period of time, powering down the short-range radio.

7. The method of claim 1, wherein the gaming request and the gaming request response are SMS messages communicated via the cellular communication protocol.

8. A mobile gaming device comprising:

a communication system configured to communicate via a cellular communication protocol and a short-range communication protocol distinct from the cellular communication protocol, the communication system comprising:

a short-range radio configured to communicate with another mobile device via the short-range communication protocol; and a controller configured to:

determine location information associated with the mobile gaming device;

communicate the location information and a gaming request via the cellular communication protocol to a game server;

receive a gaming request response from the game server via the cellular communication protocol, wherein the gaming request response indicates that the another mobile gaming device is within a communication range of the short-range communication protocol;

power up the short-range radio in response to receiving the gaming request response; and initiate a gaming session using the short-range radio, wherein the gaming session is conducted directly between the mobile gaming device and the another mobile gaming device via the short-range communication protocol.

9. The mobile gaming device of claim 8, wherein the location information is determined based on GPS information, manual information or triangulation.

10. The mobile gaming device of claim 8, wherein the gaming request response includes communication information; and wherein the mobile device uses the communication information in order to initiate the gaming session.

11. The mobile gaming device of claim 10, wherein the communication information is selected from the group consisting of: information relating to the another mobile device; an SSID of an access point, login or configuration data; and transmission rate for communicating with the another mobile device.

12. The mobile gaming device of claim 8, wherein the controller is further configured to update the location information for the mobile gaming device.

13. The mobile gaming device of claim 8, wherein the controller is further configured to:

monitor whether the mobile device establishes a communication with the another mobile device; and in response to failing to establish communication with the another mobile device within a predetermined period of time, powering down the short-range radio.

14. The method of claim 8, wherein the gaming request and the gaming request response are SMS messages communicated via the cellular communication protocol.

15. The method of claim 1, wherein the short-range communication protocol comprises Wireless Fidelity (Wi-Fi).

16. The mobile gaming device of claim 8, wherein the short-range communication protocol comprises Wireless Fidelity (Wi-Fi).

* * * * *